(12) United States Patent
Young

(10) Patent No.: US 7,866,291 B2
(45) Date of Patent: Jan. 11, 2011

(54) CAMSHAFT PHASER FOR INTERNAL COMBUSTION ENGINE

(75) Inventor: Colin J. Young, Amherstburg (CA)

(73) Assignee: Ford Global Technologies, LLC, Dearborn, MI (US)

( * ) Notice: Subject to any disclaimer, the term of this patent is extended or adjusted under 35 U.S.C. 154(b) by 348 days.

(21) Appl. No.: 12/035,671

(22) Filed: Feb. 22, 2008

(65) Prior Publication Data

US 2009/0211547 A1 Aug. 27, 2009

(51) Int. Cl.
*F01L 1/34* (2006.01)
(52) U.S. Cl. .............. 123/90.17; 123/90.15; 123/90.31
(58) Field of Classification Search .............. 123/90.15, 123/90.17, 90.31
See application file for complete search history.

(56) References Cited

U.S. PATENT DOCUMENTS

| 2,378,852 | A | 6/1945 | James |
| 5,836,277 | A | 11/1998 | Kira et al. |
| 6,006,709 | A | 12/1999 | Ushida |
| 6,311,655 | B1 | 11/2001 | Simpson et al. |
| 6,332,438 | B1 | 12/2001 | Machida |
| 6,418,897 | B1 | 7/2002 | Urban et al. |
| 6,481,402 | B1 | 11/2002 | Simpson et al. |
| 6,494,654 | B2 | 12/2002 | Espinosa |
| 6,516,763 | B1 | 2/2003 | Strauss |
| 6,647,936 | B2 | 11/2003 | Lewis |

*Primary Examiner*—Zelalem Eshete
(74) *Attorney, Agent, or Firm*—Jerome R. Drouillard; Julia Voutyras

(57) ABSTRACT

A camshaft phaser for an internal combustion engine includes a driven hub attached to a camshaft, and a drive sprocket journaled to the driven hub. A locking device uses a pin receptacle having a locking bore and an engagement ramp which is contiguous with the locking bore to allow a locking pin to extend partially from its housing pin bore before the locking pin is registered with the locking bore.

15 Claims, 4 Drawing Sheets

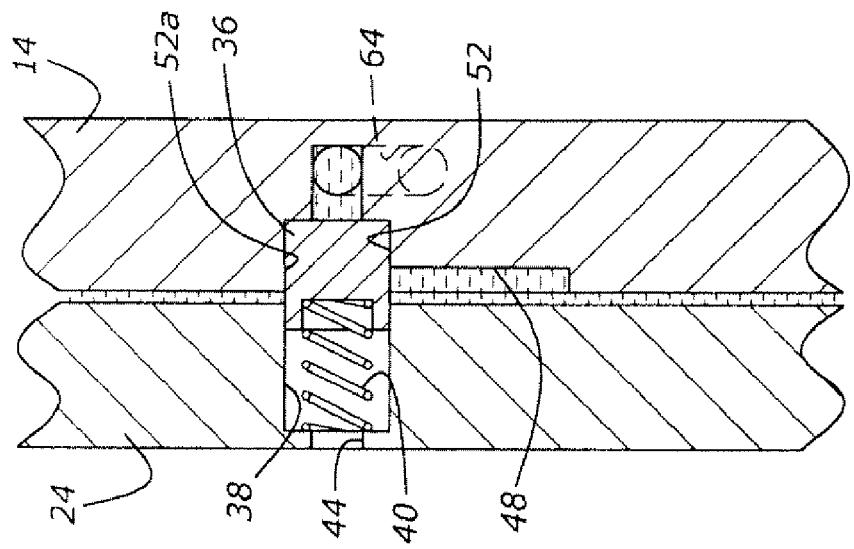
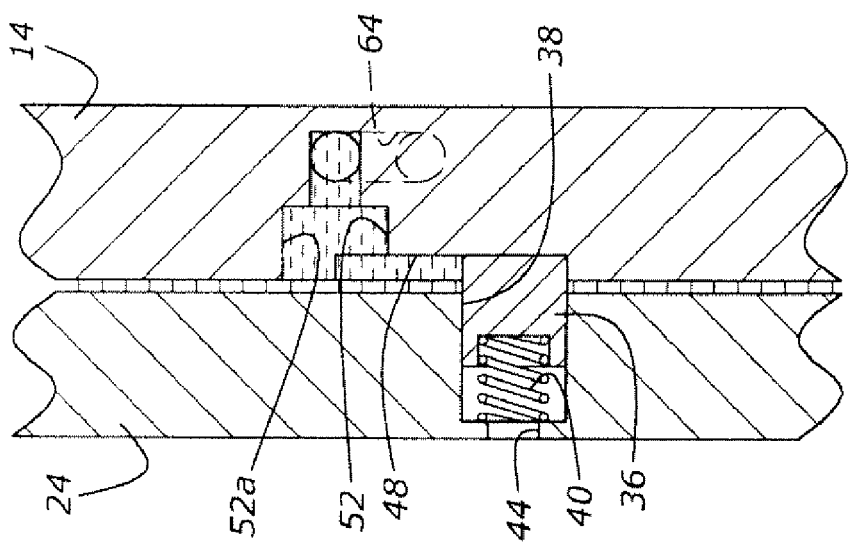
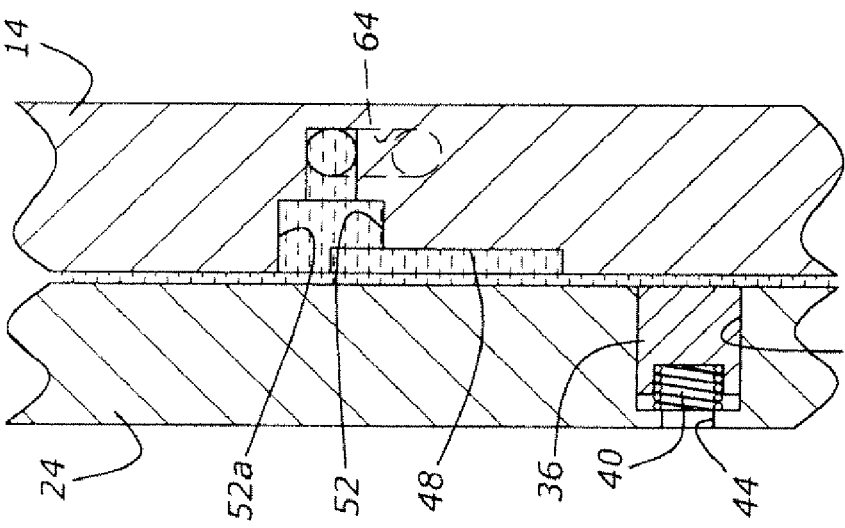

CAMSHAFT PHASER FOR INTERNAL COMBUSTION ENGINE

CROSS REFERENCE TO RELATED APPLICATIONS

None.

BACKGROUND OF THE INVENTION

1. Field of the Invention

The present invention relates to a camshaft phaser having positive phase locking at one or more camshaft-to-crankshaft orientations.

2. Related Art

Camshaft phasers are a class of devices which allow the valve operating camshaft of a reciprocating internal combustion engine to be timed, or phased, with respect to the crankshaft of the engine. Phasers typically use locking mechanisms to maintain a selected position during engine operation. Although sliding pins have been used for this purpose in the past, the results produced by pins have generally not been amenable to desired flexibility in camshaft timing because it is difficult to drive locking pins between adjacent, relatively rotating components at high speeds, as is often the case during automotive engine operation.

Various attempts have been made to at least consider, and sometimes implement, improved structures for providing high speed locking of connecting pins. For example, receiving holes have been enlarged diametrically. Although this allows latching to occur at high speed, this accommodation comes at the expense of imprecision of locating the camshaft with respect to the crankshaft.

Another means for enhancing the high speed locking capability of a phaser has been to taper or chamfer the locking pin. Although this, too, promotes high speed locking, the ramp effect of the chamfering sometimes causes the pin to work its way out of the hole, thereby allowing the desired camshaft phasing to be lost. A third way of promoting lockup under high speed is to provide a hard stop or, in other words, to lock the drive sprocket with respect to the remaining portion of the device only when the sprocket has been pulled over to a position at which further rotation with respect to the camshaft is not possible. This situation is undesirable because it allows the camshaft timing to be changed with only one degree of freedom, without any chance for further timing changes. Moreover, the timing usually produced with this arrangement is often not optimal for starting the engine, which is unfortunate because start-up is an operating mode in which more control over camshaft timing is desirable. Finally, it has been proposed to increase the spring constant of a compression spring which functions to cause a locking pin to extend into its locked position. This, however, causes operational limitations of the resulting device because the hydraulic pressure needed to retract the pin is increased, thereby limiting the conditions in which re-phasing may occur.

It would be desirable to provide a configuration for a camshaft phaser allowing positive pin lockup at high speed, and at different phase angles of the camshaft with respect to the crankshaft.

BRIEF DESCRIPTION OF THE INVENTION

According to an aspect of the present invention, a camshaft phaser for an internal combustion engine includes a driven hub attached to a camshaft, and a drive sprocket journaled to the driven hub, with the drive sprocket being rotatably indexable relative to the driven hub. A locking device selectively indexes the drive sprocket to the driven hub. The locking device includes a locking pin housed reciprocably in a pin bore formed in one of the driven hub and the drive sprocket, and at least one pin receptacle formed in the other of the driven hub and the drive sprocket at a location accessible to the locking pin when the locking pin is extended from the pin bore. The pin receptacle includes a locking bore having a section configuration generally matching the section configuration of the locking pin, and an engagement ramp contiguous with the locking bore for allowing the locking pin to extend partially from the pin bore before the locking pin is registered with the locking bore.

According to another aspect of the present invention, a first locking pin and first pin receptacle are available to selectively lock the drive sprocket to the driven hub when the drive sprocket is rotated in a first direction with respect to the driven hub, and a second locking pin and second pin receptacle are available for locking the drive sprocket to the driven hub when the drive sprocket is rotated in a second direction with respect to the driven hub. A camshaft timing advance resulting from the lockup of the first locking pin may be different from the camshaft timing advance produced by the lockup of the second locking pin.

According to another aspect of the present invention, the engagement ramp is recessed to a depth which is less than the depth of the locking bore. The engagement ramp is provided with a hydraulic fluid which may, for example, be engine oil, which exerts pressure upon the locking pin to keep the locking pin or pins in an unlocked position until it is desired to change the camshaft phasing.

According to another aspect of the present invention, the recessed engagement ramps are contiguous with the locking bores and allow locking pins to extend partially from the pin bore after the hydraulic pressure source has been deactivated but before the locking pin has become registered with the locking bore.

It an advantage of a system according to the present invention that this camshaft phaser will allow rapid and highly accurate locating of a camshaft drive sprocket with respect to the camshaft.

It is another advantage of a system according to the present invention that the camshaft phasing will be conducted with a minimum number of false latches.

It is yet another advantage of a system according to the present invention that camshaft phasing may be accomplished in either direction, while locking the camshaft with respect to the crankshaft in a selected one of a number of different angular positions.

Other advantages, as well as features of the present invention, will become apparent to the reader of this specification.

BRIEF DESCRIPTION OF THE DRAWINGS

FIG. 4 is a partial sectional view of a driven hub and drive sprocket according to the present invention, showing the present locking device in an unlocked position.

FIG. 5 is similar to FIG. 4, but shows the locking device of FIG. 4 after hydraulic pressure has been lowered and a locking pin is partially extended from a pin bore.

FIG. 6 is similar to FIGS. 4 and 5, but shows a locking pin fully seated in a locking bore so as to establish phasing between a crankshaft and a camshaft or, in other words, between a crankshaft and a camshaft via a phaser which locks the driving sprocket to the driven hub of the camshaft.

DETAILED DESCRIPTION OF THE PREFERRED EMBODIMENTS

Figure 1:
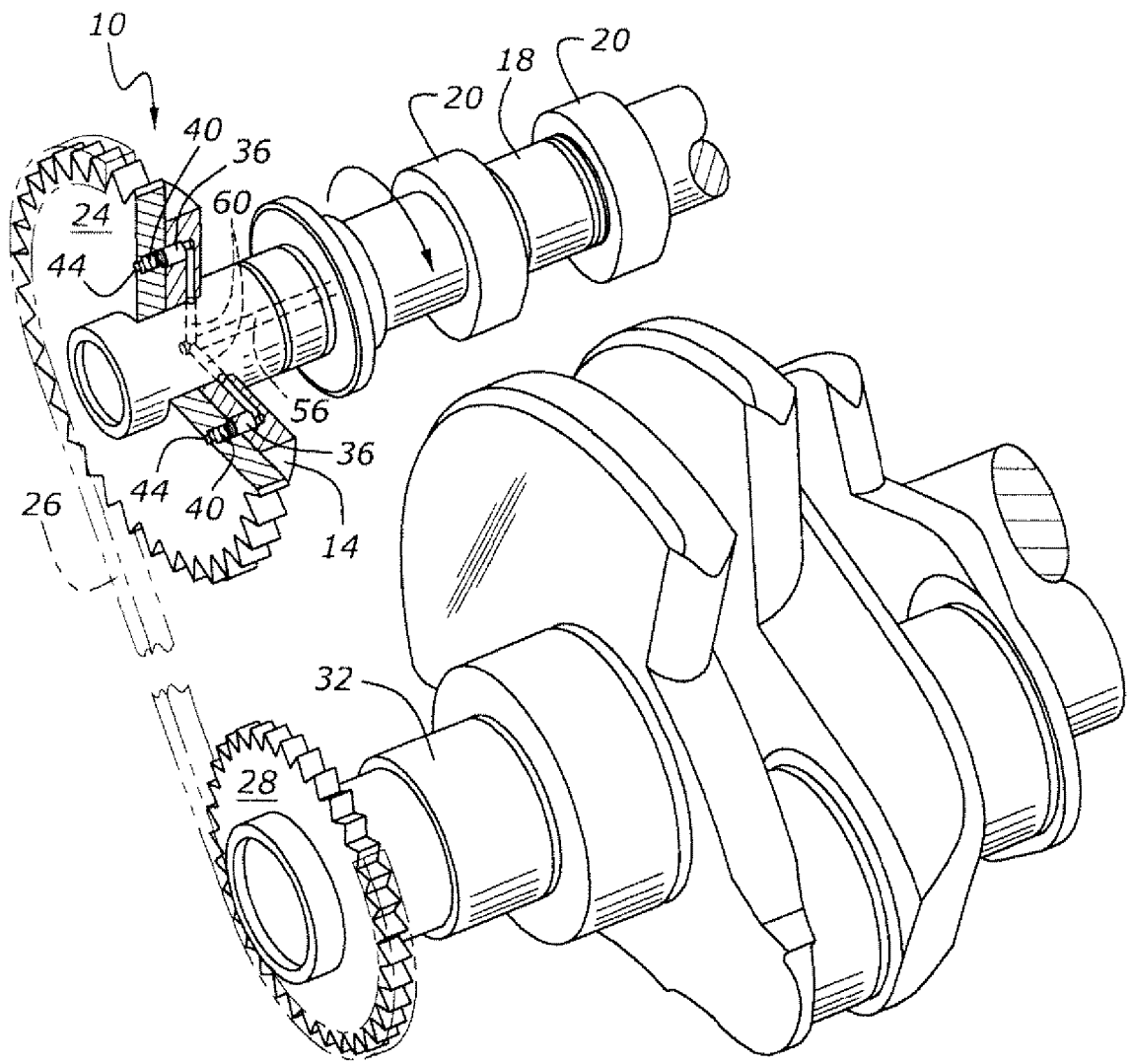
FIG. 1 is a perspective view of an engine crankshaft, camshaft, and camshaft drive mechanism including a phaser according to the present invention.

As shown in FIG. 1, crankshaft 32, having a crankshaft sprocket 28, powers a chain, 26, which rotates drive sprocket 24. Drive sprocket 24 operates a camshaft, 18, which has a plurality of cam lobes, 20. The torque necessary for driving sprocket 24 to power camshaft 18 is a direct result of the force transmitted by one or more locking pins 36, which are driven between sprocket 24 and driven hub 14. It should be clear from this description that driven hub 14 cannot rotate with respect to camshaft 18. In other words, driven hub 14 is rotationally locked to camshaft 18.

Figure 2:
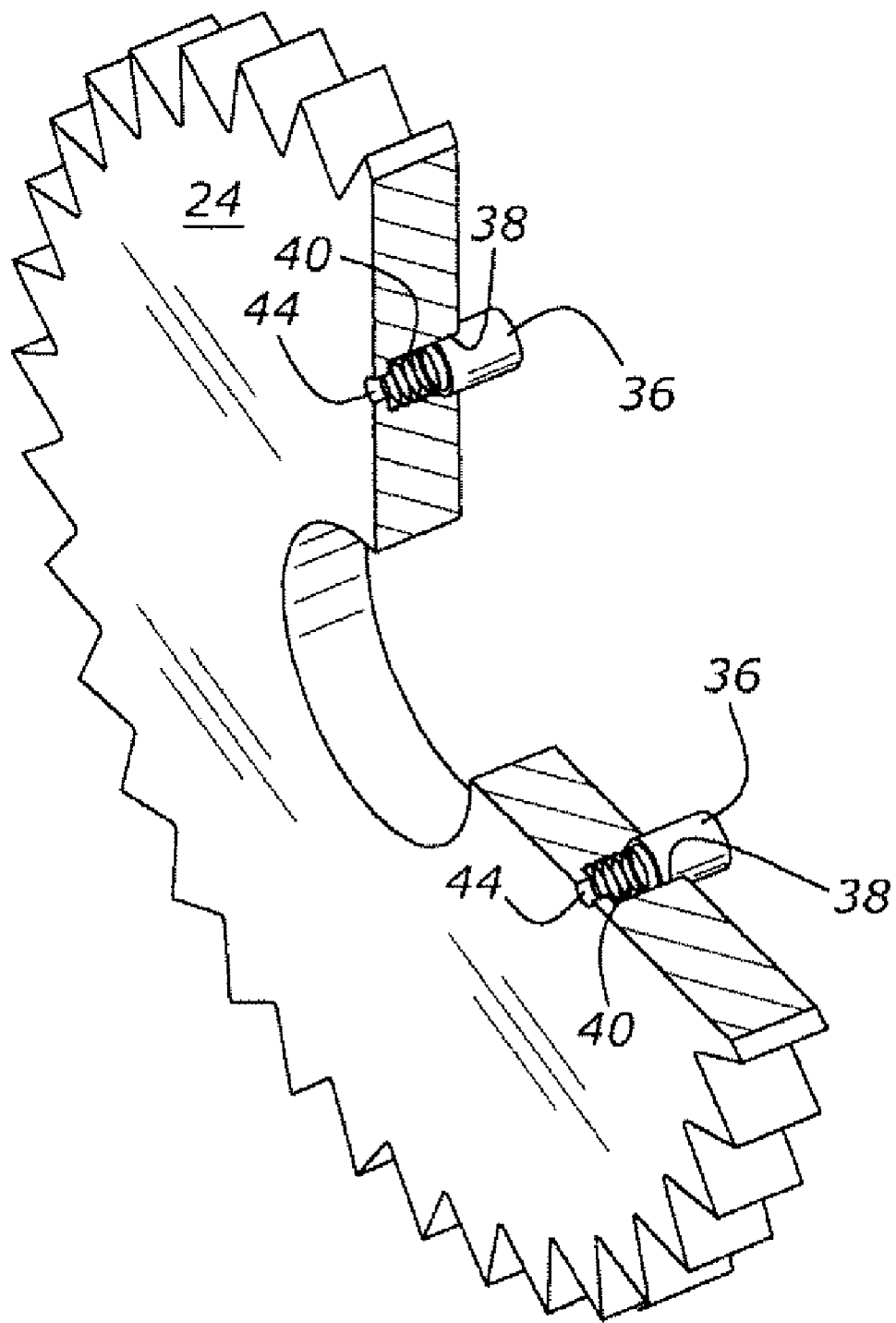
FIG. 2 is a perspective view of a drive sprocket according to an aspect of the present invention.

FIG. 2 illustrates drive sprocket 24 as having pin bores, 38, which house locking pins 36. Pins 36 serve to selectively index drive sprocket 24 to driven hub 14. As noted above, each of locking pins 36 is housed in one of pin bores 38. Each of pins 36 is urged into the locking position by a compression spring, 40. Pin bores 38 also have a bleed orifice, 44, which prevents fugitive oil from building up behind locking pins 36 and thereby hydrostatically preventing locking pins 36 from moving to an unlocked position.

Figure 3:
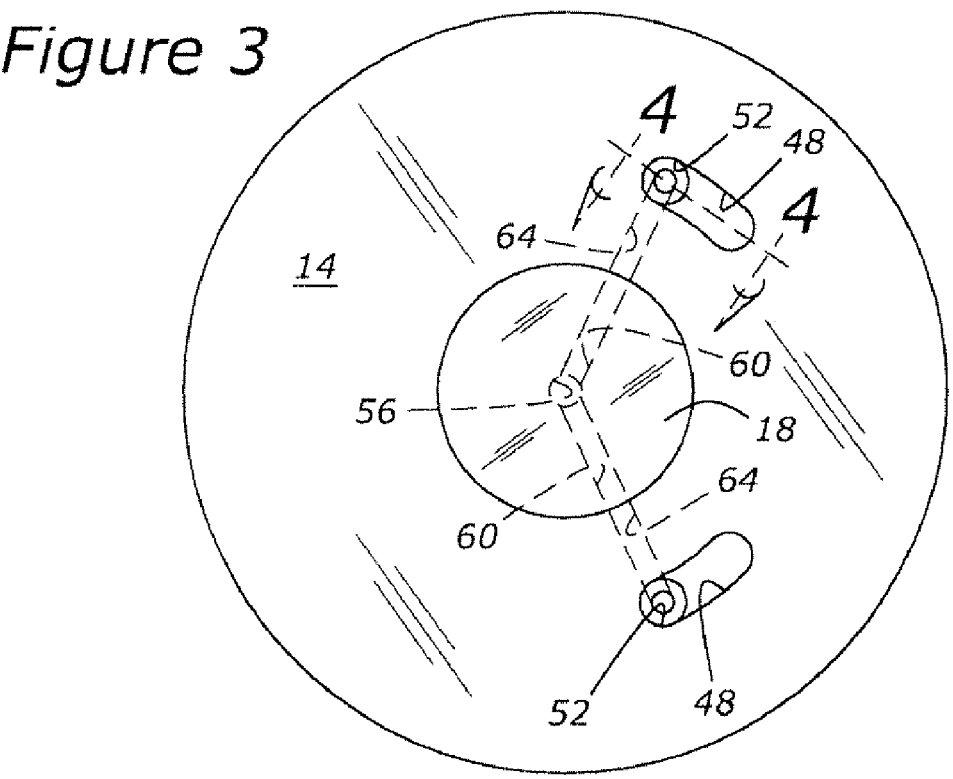
FIG. 3 is a plan view of a driven hub according to an aspect of the present invention.

FIG. 3 shows first details of pin receptacles formed in driven hub 14 at locations accessible to locking pins 36 when locking pins 36 are extended from pin bores 38. Each of the pin receptacles includes an engagement ramp, 48, which is recessed to a depth which is less than the depth of the contiguous locking bore 52 associated with each engagement ramp. Ramps 48 preferably have an invariant depth, which facilitates manufacturing of the present system.

FIG. 3, and also, FIG. 1, show that locking bores 52 and, for that matter, engagement ramps 48, are furnished with high pressure oil which originates within an axial cam bore 56 and which flows outwardly through radial camshaft bores 60 and into radial hub bores 64. When high pressure oil, most likely lubricant oil, is furnished to locking bore 52 and engagement ramps 48, the result is that, as shown in FIG. 4, locking pins 36 are maintained in their retracted position against the urging force of compression springs 40. This allows the phasing of drive sprocket 24 and, hence, crankshaft 32, to change with respect to driven hub 40 and, accordingly, camshaft 18.

As seen in FIG. 4, locking pin 36 provides no impediment to the relative movement of drive sprocket 24 with respect to driven hub 14 when locking pin 36 has been pushed into its retracted position by hydraulic pressure acting through passages 56, 60, and 64. However, at FIG. 5, hydraulic pressure has been lessened through passages 56, 60, and 64 to the extent that pin 36 is available to extend axially from pin bore 38. This brings another advantage to mind, inasmuch as it is not required to have a very powerful spring 40 to extend locking pin 36. As noted above, this is indeed fortunate, because a more powerful spring will require higher hydraulic pressure, thereby limiting the capabilities of the system.

It is notable in FIG. 5 that pin 36 is now enmeshed with engagement ramp 48 and has begun sliding along engagement ramp 48 toward locking bore 52. When locking pin 36 reaches abutment 52a on the far side of locking bore 52, the relative rotation of sprocket 24 with respect to driven hub 14 will be arrested, and pin 36 will extend fully into bore 52, thereby locking drive sprocket 24 with driven hub 14 (FIG. 6).

FIG. 3 illustrates two pin bores 52, with the pin bores being available to provide different phasings of camshaft 18 with respect to crankshaft 32. Notice, too, that engagement ramps 48 are on opposite sides of their respective locking bores 52, which allow the engagement ramps to be used when the driving sprocket 24 is rotating in either direction with respect to camshaft 18.

Figure 7:
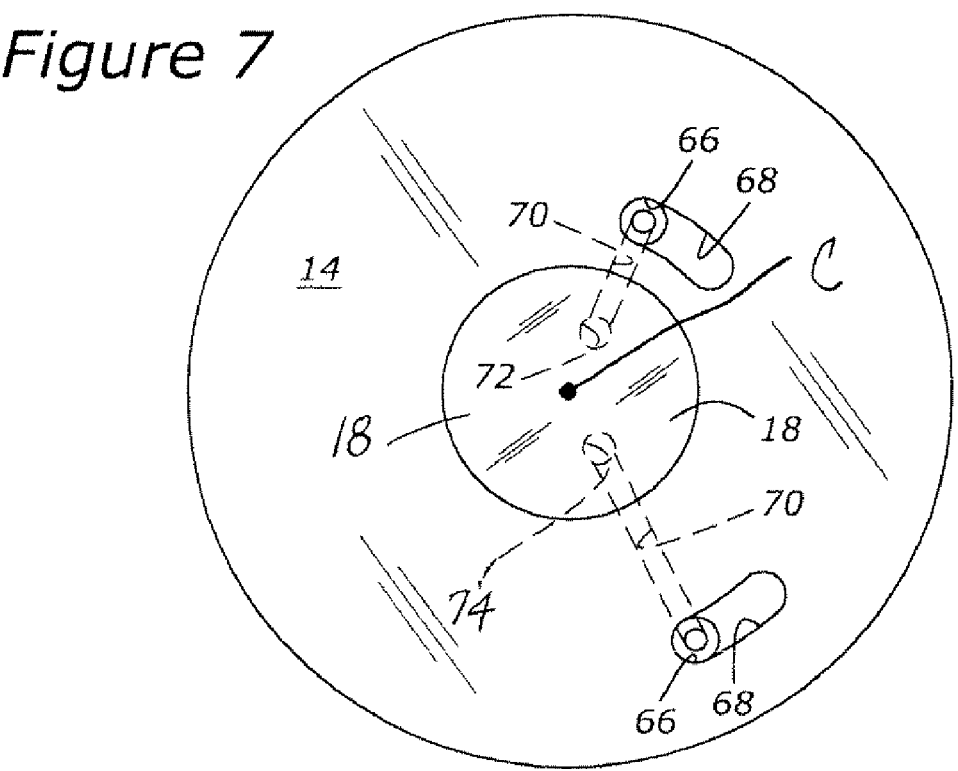
FIG. 7 is similar to FIG. 3, but shows another embodiment having locking bores and engagement ramps located at different radii from the axially directed center line of a camshaft.

Engagement ramps 48 are arcuately shaped and have a radius of curvature matching the radius of revolution of the locking pins. This is particularly apparent from the separate embodiment shown in FIG. 7, which illustrates two locking bores, 66, and two engagement ramps, 68, set at different radial distances from the axially directed centerline, C, of camshaft 18. Because each of the locking pins 68 is fed from a separate axially directed bore, 72, or 74, locking pins 68 may be engaged independently.

Those skilled in the art will appreciate in view of this disclosure that the forces necessary to displace driven hub 14 and camshaft 18 rotationally with respect to sprocket 24 may be provided either by the forces acting upon the camshaft as a result of the energy stored in the valve springs, or by a hydraulically or electrically driven device. Such devices are known in the art and are not part of the present invention.

The foregoing invention has been described in accordance with the relevant legal standards, thus the description is exemplary rather than limiting in nature. Variations and modifications to the disclosed embodiment may become apparent lo those skilled in the art and fall within the scope of the invention. Accordingly the scope of legal protection afforded this invention can only be determined by studying the following claims.

What is claimed is:

1. A camshaft phaser for an internal combustion engine, comprising:
    a driven hub attached to a camshaft;
    a drive sprocket journaled to said driven hub, with said drive sprocket being rotatably indexable relative to said driven hub; and
    a locking device for selectively indexing the drive sprocket to the driven hub, with said locking device comprising:
    a locking pin housed reciprocably in a pin bore formed in one of said driven hub and said drive sprocket;
    at least one pin receptacle formed in the other of said driven hub and said drive sprocket at a location accessible to said locking pin when said locking pin is extended from the pin bore, with said pin receptacle comprising:
    a locking bore having a section configuration generally matching the section configuration of said locking pin; and
    an engagement ramp contiguous with said locking bore for allowing the locking pin to extend partially from said pin bore before, the locking pin is registered with the locking bore.

2. A camshaft phaser according to claim 1, wherein said locking pin is resiliently urged to a locking position.

3. A camshaft phaser according to claim 2, wherein said locking pin is hydraulically movable to an unlocked position.

4. A camshaft phaser according to claim 3, wherein said engagement ramp and said pin bore are connected hydraulically.

5. A camshaft phaser according to claim 1, having a first pin receptacle corresponding to a first amount of camshaft timing advance and a second pin receptacle corresponding to a second amount of camshaft timing advance.

6. A camshaft phaser according to claim 5, wherein said first pin receptacle and said second pin receptacle are located at a different radii from the axially directed center line of the camshaft.

7. A camshaft phaser according to claim 1, having a first locking pin and first pin receptacle for selectively locking the drive sprocket to the driven hub when the drive sprocket is rotated in a first direction with respect to the driven hub and a second locking pin and second pin receptacle for locking the drive sprocket to the driven hub when the drive sprocket is rotated in a second direction with respect to the driven hub, with said first locking pin and said second locking pins being independently operable.

8. A camshaft phaser according to claim 7, wherein the camshaft timing advance resulting from lockup of said first locking pin is different from the camshaft timing advance produced by lockup of the second locking pin.

9. A camshaft phaser according to claim 1, wherein said engagement ramp is arcuately shaped, with a radius of curvature matching a radius of revolution of said locking pin.

10. A camshaft phaser according to claim 1, wherein said engagement ramp is recessed to a depth which is less than the depth of the locking bore.

11. A camshaft phaser according to claim 1, wherein said locking pin is housed in said driven hub.

12. A camshaft phaser according to claim 1, wherein said locking pin is housed in said drive sprocket.

13. A camshaft phaser for an internal combustion engine, comprising:
   a driven hub attached to a camshaft;
   a drive sprocket driven by a crankshaft, with said drive sprocket being journaled to said driven hub and with said drive sprocket being rotatably indexable relative to said driven hub; and
   a locking device for selectively indexing the drive sprocket to the driven hub, with said locking device comprising:
   a locking pin housed reciprocably in a pin bore formed in one of said driven hub and said drive sprocket, with said locking pin being normally locked and movable by a selectively deactivatable hydraulic pressure source to an unlocked position;
   at least one pin receptacle formed in the other of said driven hub and said drive sprocket at a location accessible to said locking pin when said locking pin is extended from the pin bore, with said pin receptacle comprising:
   a locking bore for receiving the locking pin, with said locking bore having a wall with a section configuration generally matching the section configuration of said locking pin; and
   a recessed engagement ramp, contiguous with said locking bore, for allowing the locking pin to extend partially from said pin bore after said hydraulic pressure source has been deactivated, but before the locking pin has become registered with the locking bore, whereby said locking pin will impact upon the wall of said locking bore before extending fully into said locking bore.

14. A camshaft phaser according to claim 13 having a first locking pin for selectively locking the drive sprocket to the driven hub in a first position corresponding to a first amount of camshaft timing advance and a second locking pin for selectively locking the drive sprocket to the driven hub in a second position corresponding to a second amount of camshaft timing advance.

15. A camshaft phaser according to claim 13, wherein said engagement ramp has an invariant depth.

\* \* \* \* \*